United States Patent
Shibata et al.

(10) Patent No.: US 9,506,021 B2
(45) Date of Patent: Nov. 29, 2016

(54) GLASS-ELECTRODE RESPONSIVE-GLASS CLEANING LIQUID AND METHOD FOR CLEANING GLASS-ELECTRODE RESPONSIVE-GLASS

(71) Applicant: HORIBA, Ltd., Kyoto (JP)

(72) Inventors: Manabu Shibata, Kyoto (JP); Nahoko Nishimura, Kyoto (JP); Takeshi Mori, Kyoto (JP); Hisashi Yamanouchi, Kyoto (JP); Katsuaki Ogura, Kyoto (JP)

(73) Assignee: HORIBA, LTD., Kyoto-Shi, Kyoto (JP)

( * ) Notice: Subject to any disclaimer, the term of this patent is extended or adjusted under 35 U.S.C. 154(b) by 0 days.

(21) Appl. No.: 14/474,886

(22) Filed: Sep. 2, 2014

(65) Prior Publication Data
US 2015/0064344 A1    Mar. 5, 2015

(30) Foreign Application Priority Data
Sep. 2, 2013   (JP) ................................. 2013-180920

(51) Int. Cl.
| | | |
|---|---|---|
| *C11D 7/10* | (2006.01) | |
| *C11D 11/00* | (2006.01) | |
| *B05D 3/10* | (2006.01) | |
| *C03C 4/18* | (2006.01) | |
| *C03C 15/00* | (2006.01) | |
| *C03C 23/00* | (2006.01) | |

(52) U.S. Cl.
CPC ................. *C11D 7/10* (2013.01); *B05D 3/104* (2013.01); *C03C 4/18* (2013.01); *C03C 15/00* (2013.01); *C03C 23/0075* (2013.01); *C11D 11/0035* (2013.01); *C11D 11/0047* (2013.01)

(58) Field of Classification Search
CPC ....... C03C 15/00; C03C 15/02; C03C 19/00; C03C 2204/08; C11D 3/042; C11D 11/0035
See application file for complete search history.

(56) References Cited

U.S. PATENT DOCUMENTS

| | | | |
|---|---|---|---|
| 2,366,489 A | 1/1945 | Cary et al. | |
| 2,462,843 A | 3/1949 | Cary et al. | |
| 3,129,160 A | 4/1964 | Carter | |
| 4,055,458 A * | 10/1977 | Niederprum | C03C 15/02 216/97 |
| 4,650,562 A | 3/1987 | Harman, III et al. | |
| 5,281,350 A * | 1/1994 | Gimm | H01L 21/31111 216/97 |
| 5,415,731 A * | 5/1995 | Kim | C03C 15/00 216/97 |
| 6,284,721 B1 * | 9/2001 | Lee | C03C 15/00 134/2 |
| 6,297,208 B1 | 10/2001 | Crist | |
| 6,471,880 B1 * | 10/2002 | Trouve | C03C 15/00 216/31 |
| 6,568,995 B1 * | 5/2003 | Mitani | C11D 3/0042 451/36 |
| 6,807,824 B1 * | 10/2004 | Miwa | C03C 15/00 216/97 |
| 2007/0209685 A1 * | 9/2007 | Shrivastava | B08B 3/12 134/41 |
| 2015/0175478 A1 * | 6/2015 | Ravichandran | C03C 15/00 428/141 |

FOREIGN PATENT DOCUMENTS

JP    2003262605 A    9/2003

OTHER PUBLICATIONS

Extended European Search Report issued in European patent application No. 14183125.5-1354; Date of Mailing: Mar. 3, 2015.

* cited by examiner

*Primary Examiner* — Gregory Webb
(74) *Attorney, Agent, or Firm* — Cantor Colburn LLP

(57) ABSTRACT

To maintain a uniform etching rate during cleaning of a responsive glass in a glass electrode, a responsive-glass cleaning liquid for a glass electrode 1 serves to clean a responsive glass 2 used in the glass electrode 1, is used with a hydrated-layer forming solution for forming a hydrated layer on the surface of the responsive glass 2, and contains ammonium hydrogen fluoride having a predetermined concentration, or a salt of a strong base containing hydrofluoric acid and a fluoride ion.

7 Claims, 3 Drawing Sheets

GLASS-ELECTRODE RESPONSIVE-GLASS CLEANING LIQUID AND METHOD FOR CLEANING GLASS-ELECTRODE RESPONSIVE-GLASS

CROSS REFERENCE

The present invention claims priority under 35 U.S.C. §119 to Japanese Application No. 2013-180920 filed Sep. 2, 2013, the entire content of which is incorporated herein by reference.

TECHNICAL FIELD

The present invention relates to a cleaning liquid for a responsive glass used in a glass electrode, and a method for cleaning the responsive glass for the glass electrode.

BACKGROUND ART

For a responsive glass used in a glass electrode, depending on a storage state and a usage state, an impurity (stain) may adhere to a hydrated layer formed on the surface of the responsive glass. As known, the responsivity of such glass electrode using the responsive glass lowers due to inhibition of electrode reaction or the like.

An example of a method for recovering the lowering of the responsivity of the glass electrode is a method for cleaning the responsive glass described in Patent Literature 1.

In the method described in Patent Literature 1, the responsive glass is cleaned by immersing the responsive glass in a drug solution (for example, hydrofluoric acid) fed into a cleaning bath for a predetermined time.

CITATION LIST

Patent Literature

Patent Literature 1: JPA-2003-262605

SUMMARY OF INVENTION

Technical Problem

In the above-mentioned document, the responsive glass is cleaned by removing the hydrated layer formed on the surface of the responsive glass by etching using hydrofluoric acid. The hydrofluoric acid is dissociated in the solution as follows.

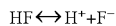

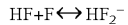

Although ion species that contribute to the etching of the hydrated layer are $HF_2^-$ ions, $F^-$ ions are hardly dissociated in a hydrofluoric acid solution and thus, $HF_2^-$ ions are hardly generated. Accordingly, even when $HF_2^-$ ions are consumed by etching, hydrofluoric acid has a low buffering capacity to generate and supply $HF_2^-$ ions, which makes control of the etching rate difficult.

This causes a problem that a slight deviation from predetermined concentration of hydrofluoric acid or etching time disables desired etching. Further, excessive peeling of the responsive glass by etching causes a problem that a byproduct such as silicofluoride adheres to the surface of the responsive glass, lowering the responsivity of the glass electrode.

Moreover, the etching rate of hydrofluoric acid having a low buffering capacity is affected by environmental factors such as temperature, makes desired etching more difficult.

To solve the above-mentioned problems, the present invention intends to provide a glass-electrode responsive-glass cleaning liquid and a glass-electrode responsive-glass cleaning method that can easily control the etching rate to optimally clean the glass electrode.

Solution to Problem

That is, the glass-electrode responsive-glass cleaning liquid according to the present invention for cleaning a responsive glass used in a glass electrode is a glass-electrode responsive-glass cleaning liquid that is used with a hydrated-layer forming solution for forming a hydrated layer on the surface of the responsive glass after cleaning, and contains ammonium hydrogen fluoride having a predetermined concentration or a salt of a strong base containing hydrofluoric acid and a fluoride ion.

With such configuration, the responsive glass is etched using ammonium hydrogen fluoride or the salt of the strong base containing the hydrofluoric acid and the fluoride ion. Ammonium hydrogen fluoride or the salt of the strong base containing hydrofluoric acid has a high buffering capacity to generate and supply ions that contribute to etching ($HF_2^-$ ions) even when $HF_2^-$ ions are consumed and therefore, can control the etching rate more easily than hydrofluoric acid. Thus, even when the predetermined concentration of hydrofluoric acid and etching time are strictly controlled, desired etching can be achieved. Moreover, due to the high buffering capacity, the etching rate can be controlled under varying environmental factors.

The hydrated-layer forming solution is preferably neutral or acidic. When the hydrated-layer forming solution is neutral, for example, pure water or ion-exchange water, a water-washing step after the hydrated-layer forming step is unnecessary and can be omitted, simplifying the responsive-glass cleaning step. When the hydrated-layer forming solution is acidic, dissociated hydrogen ions generate oxonium ions in the solution, and promotes formation of the hydrated layer, reducing reaction time.

The concentration of ammonium hydrogen fluoride is preferably 4 mass % or less.

This concentration enables easier control of the etching time. In addition, since ammonium hydrogen fluoride does not need to be handled as a deleterious substance, handling of the responsive-glass cleaning liquid is simplified.

For the glass-electrode responsive-glass cleaning liquid that serves to clean the responsive glass containing a metal oxide as a component, metal ions in the metal oxide forming the responsive glass unite with ununited oxygen molecules in $SiO_2$ before etching to disturb a network of $SiO_2$, and etching of the hydrated layer is promoted from this part, reducing the etching time. Examples of the metal oxide include a lithium oxide.

A glass-electrode responsive-glass cleaning method according to the present invention includes a step of cleaning a responsive glass used in a glass electrode by using a responsive-glass cleaning liquid containing ammonium hydrogen fluoride, or a salt of a strong base containing hydrofluoric acid and a fluoride ion.

The glass-electrode responsive-glass cleaning method according to the present invention may further includes a hydrated-layer forming step of forming a hydrated layer on the surface of the responsive glass by using a neutral or acidic hydrated-layer forming solution, after the cleaning step of cleaning the responsive glass.

In the cleaning step of the glass-electrode responsive-glass cleaning method, the temperature of the responsive-glass cleaning liquid is preferably, kept to be 5 to 40° C.

Advantageous Effects of Invention

As described above, according to the present invention, the etching rate can be easily controlled to optimally clean the glass electrode.

DESCRIPTION OF EMBODIMENTS

An embodiment of a glass-electrode responsive-glass cleaning liquid according to the present invention will be described below.

The glass-electrode responsive-glass cleaning liquid in accordance with the present embodiment serves to clean a responsive glass 2 used in a glass electrode 1, is used with a hydrated-layer forming solution for forming a hydrated layer on the surface of the responsive glass 2 after cleaning, and contains ammonium hydrogen fluoride having a predetermined concentration, or a salt of a strong base containing hydrofluoric acid and a fluoride ion.

Figure 1:
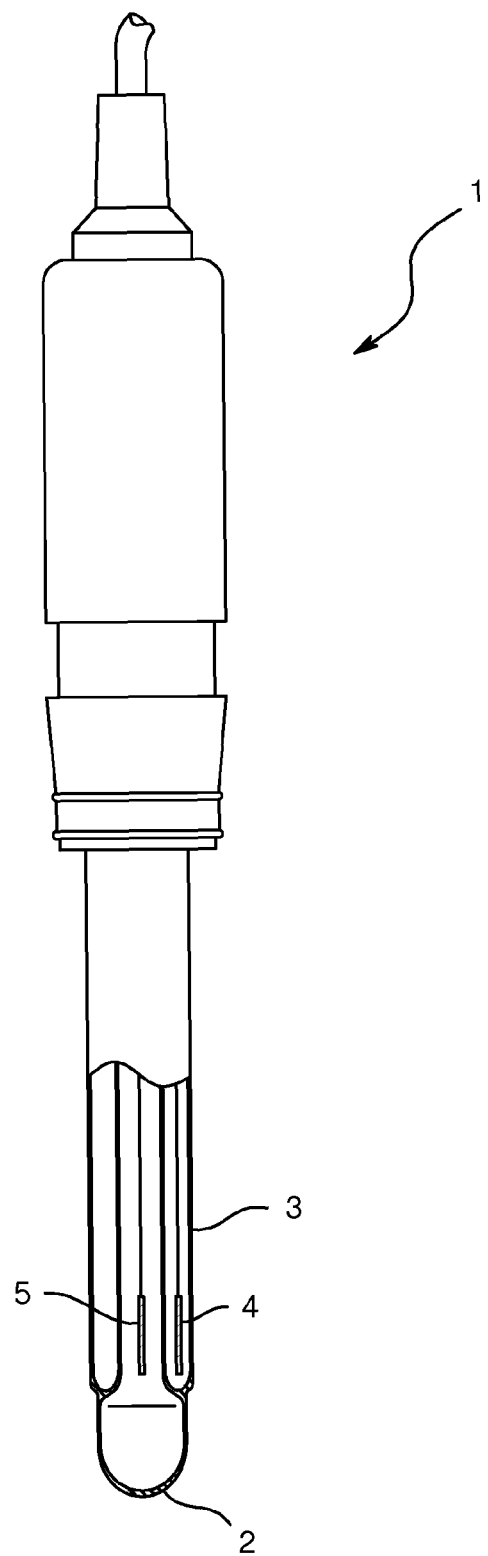
FIG. 1 is a schematic view showing a glass electrode to be cleaned with a glass-electrode responsive-glass cleaning liquid in the present embodiment.

As shown in FIG. 1, the glass electrode 1 functions to measure pH, is configured to fill a glass support tube 3 having a front end, to which the responsive glass 2 is bonded, with an internal solution having a uniform concentration, such as a potassium chloride solution, and immerse a pH electrode 5 and a comparison electrode 4 in the internal solution, and has a composite configuration in which the pH electrode 5 and the comparison electrode 4 are united.

Immersion of the responsive glass 2 in a test solution, pH of which is to be found, generates an electromotive force corresponding to a pH difference between the internal solution having a known pH and the test solution, and the pH electrode 5 and the comparison electrode 4 detect the electromotive force to measure the pH value of the test solution.

The responsive-glass cleaning liquid for the glass electrode 1 contains ammonium hydrogen fluoride of 4 mass % or less, or a salt of a strong base containing hydrofluoric acid and a fluoride ion such as sodium fluoride or potassium fluoride.

The hydrated-layer forming solution is used after cleaning of the responsive glass 2 by using the responsive-glass cleaning liquid for the glass electrode 1, and serves to form a hydrated layer on the surface of the responsive glass 2. Examples of the hydrated-layer forming solution include a standard solution having a pH of 2 or 4, an acidic solution such as hydrochloric acid, nitric acid, or sulfuric acid, a standard solution having a PH of 7, and a neutral solution such as pure water or ion-exchange water. However, the acidic solution does not includes hydrofluoric acid.

The responsive glass 2 may be lithium glass (lithium-containing glass).

Next, a glass-electrode responsive-glass cleaning method in accordance with the present embodiment will be described.

Figure 2:
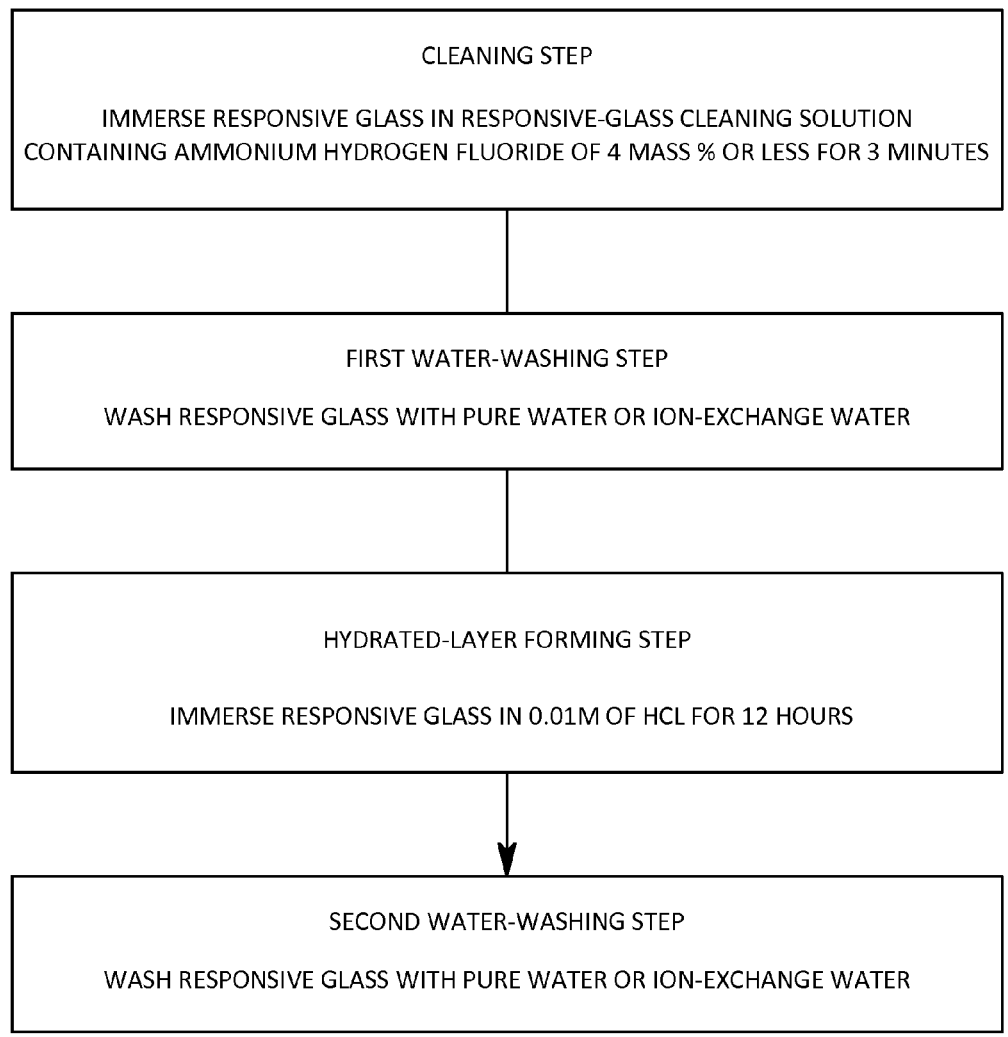
FIG. 2 is a flow chart showing a glass-electrode responsive-glass cleaning method in the present embodiment.

The glass-electrode responsive-glass cleaning method in the present embodiment, as shown in FIG. 2, includes a cleaning step of cleaning a responsive glass used in a glass electrode with a responsive-glass cleaning liquid containing ammonium hydrogen fluoride, a first water-washing step of performing water-washing after the cleaning step, a hydrated-layer forming step of forming a hydrated layer on the surface of the responsive glass with a neutral or acidic hydrated-layer forming solution after the first water-washing step, and a second water-washing step of performing water-washing again after the hydrated-layer forming step.

The cleaning step will be described in detail.

The responsive glass is configured by uniting silicon atoms with oxygen atoms in the form of a mesh, water molecules enters into the mesh-like $SiO_2$ to form the hydrated layer, and an impurity (stain) invades into the hydrated layer, lowering the responsivity of the glass electrode.

Thus, the responsive glass is immersed in ammonium hydrogen fluoride of 4 mass % or less, or a salt of a strong base containing hydrofluoric acid and a fluoride ion such as sodium fluoride or potassium fluoride for 3 minutes, for example, to etch the hydrated layer.

Ammonium hydrogen fluoride is dissociated in the solution as follows.

$$NH_4(HF_2) \rightarrow NH_4^+ + HF_2^-$$

$$HF_2^- \leftrightarrow HF + F^-$$

$$HF \leftrightarrow H^+ + F^-$$

Since ion species that contribute to etching of the hydrated layer are $HF_2^-$ ions, $SiO_2$ in the hydrated layer is etched by $HF_2^-$ ions according to following reaction.

$$SiO_2 + 3HF_2^- + H^+ \rightarrow SiF_6^{-} + 2H_2O$$

$$2NH_4 + SiF_6^- \rightarrow (NH_4)_2SiF_6$$

As apparent from the dissociated state in the solution, ammonium hydrogen fluoride can easily generate $HF_2^-$ ions that are ion species contributing to the etching. Accordingly, even when $HF_2^-$ ions are consumed through the etching reaction, ammonium hydrogen fluoride has a high buffering capacity to generate and supply $HF_2^-$ ions, and can successively supply $HF_2^-$ ions according to the etching reaction.

The mixed solution of the salt of the strong base containing the fluoride ion such as sodium fluoride or potassium fluoride and hydrofluoric acid is dissociated in the solution as follows. The dissociated state of the sodium fluoride is described as an example.

$$NaF \rightarrow Na^+ + F^-$$

$$HF \leftrightarrow H^+ + F^-$$

$$HF + F^- \leftrightarrow HF_2^-$$

In the solution, since completely-dissociated sodium fluoride can supply Fat all times, and hydrofluoric acid is a weak acid having a dissociation constant of $6.76 \times 10^{-4}M$ and is hardly dissociated, $HF_2^-$ ions that are ion species contributing to the etching can be easily generated. Also in the salt of the strong base containing the fluoride ion, even when $HF_2^-$ ions are consumed through the etching reaction, the salt of the strong base has a high buffering capacity to generate and supply $HF_2^-$ ions, and can successively supply $HF_2^-$ ions according to the etching reaction.

As the temperature of the responsive-glass cleaning liquid is higher, the etching reaction is promoted to reduce the cleaning time. However, the temperature is too low, the responsive-glass cleaning liquid is frozen to stop the etching reaction. Thus, the temperature is desirably set to be 0° C. or higher at which the responsive-glass cleaning liquid is never frozen. For this reason, the temperature of the responsive-glass cleaning liquid may be set to be 5° C. or more and 40° C. or less such that the cleaning liquid has a good operational performance/operability and can be used under room temperature.

In a first water-washing step, ammonium hydrogen fluoride adhered to the responsive glass in the cleaning step is removed to stop the etching, and the responsive glass is cleaned with pure water or ion-exchange water.

In a hydrated-layer forming step, a hydrated layer is formed again on the surface of the responsive glass from which the hydrated layer is removed in the cleaning step, and the responsive glass is immersed in the 0.01 M of hydrochloric acid for 12 hours, for example. Then, in hydrogen ions-rich hydrochloric acid, water molecules enter into the mesh of $SiO_2$ on the surface of the responsive glass to form the hydrated layer.

In a second water-washing step, hydrochloric acid adhered to the responsive glass in the hydrated-layer forming step is removed to make the glass electrode measurable, the responsive glass is cleaned with pure water or ion-exchange water, and water droplets adhered to the responsive glass are wiped off with filter paper or tissue as appropriate.

The glass-electrode responsive-glass cleaning liquid thus configured in the present embodiment has following special effects.

That is, the responsive glass is etched using ammonium hydrogen fluoride. Ammonium hydrogen fluoride has a high buffering capacity to generate and supply ions that contribute to etching ($HF_2^-$ ions) even when $HF_2^-$ ions are consumed and therefore, can control the etching rate more easily than hydrofluoric acid. Thus, even when the predetermined concentration of hydrofluoric acid and etching time are not strictly controlled, desired etching can be achieved. Moreover, due to the high buffering capacity, the etching rate can be controlled under varying environmental factors.

Since the concentration of ammonium hydrogen fluoride is 4 mass % or less, the etching time can be controlled more easily. In addition, since ammonium hydrogen fluoride does not need to be handled as a deleterious substance, handling of the responsive-glass cleaning liquid is simplified.

When the hydrated-layer forming solution is neutral, for example, pure water or ion-exchange water, the water-washing step after the hydrated-layer forming step is unnecessary and can be omitted, simplifying the responsive-glass cleaning step.

When the acidic solution is used in the hydrated-layer forming step, hydrogen ions dissociated in the acidic solution unite with water molecules to form oxonium ions. Then, water molecules and oxonium ions enter into mesh of $SiO_2$ on the surface of the responsive glass, promoting the formation of the hydrated layer to reduce the reaction time. In addition, the acidic solution such as hydrochloric acid, nitric acid, or sulfuric acid can melt metal to remove a metal-induced stain. Especially, hydrochloric acid can remove the metal-induced stain, and unlike nitric acid and sulfuric acid, can prevent a liquid junction potential leading to a measurement error because chloride ions are initially contained in the internal solution of the glass electrode. For this reason, hydrochloric acid is less affected by liquid junction and thus, may have any concentration.

For the glass-electrode responsive-glass cleaning liquid that serves to clean the responsive glass containing a metal oxide as a component, metal ions in the metal oxide forming the responsive glass unite with ununited oxygen molecules in $SiO_2$ before etching to disturb a network of $SiO_2$, and etching of the hydrated layer is promoted from this part, reducing the etching time.

The present invention is not limited to the embodiment.

Although the responsive glass is lithium glass (lithium-rich glass) in the embodiment, the responsive glass may be any glass containing metal to improve performances including electric conductivity of the responsive glass (for example, calcium, titanium, and zirconia).

Although the glass electrode serves to measure pH in the embodiment, the glass electrode may serve to measure pNa in addition to pH.

The present invention may be variously modified so as not to deviate from the subject matter.

Example

The present invention will be described below in more detail using an example, but the present invention is not limited to the example.

<Sample>

20 pH electrodes as glass electrodes using the responsive glass were divided into two groups, 95% response time was measured without any treatment in one group (hereinafter referred to as comparison example), and the 95% response time was measured after performing the cleaning method of the present invention in the other group (hereinafter referred to as the example).

<Test Method>

A test method in the example will be described.

Cleaning Method of the Present Invention

In the cleaning method of the present invention, the responsive glasses of the pH electrodes in the example were immersed in 0.1 M of ammonium hydrogen fluoride for 3 minutes, and then, in 0.01 M of HCl for 12 hours.

Method for Measuring 95% Response Time

A method for measuring the 95% response time will be described as follows.

First, the pH electrodes in the example and the pH electrodes in the comparison example were immersed in a standard solution of pH 4, and measurement values $E_0$ after an elapse of 3 minutes were checked. Then, the pH electrodes were cleaned with pure water (ion-exchange water), and water droplets were wiped off with filter paper or tissue. Then, the pH electrodes were immersed in tap water for 10 minutes. During this immersion, the measurement values were recorded, and measurement values E after an elapse of 10 minutes were checked.

Subsequently, in the recorded measurement values, given that an electromotive force difference between E and $E_0$ is 100%, time required to reach an electromotive force difference of 95% (95% response time) was checked. The measurement method was repeated multiple times to find standard deviations and average values in the comparison example and the example.

<Test Result>

Figure 3:
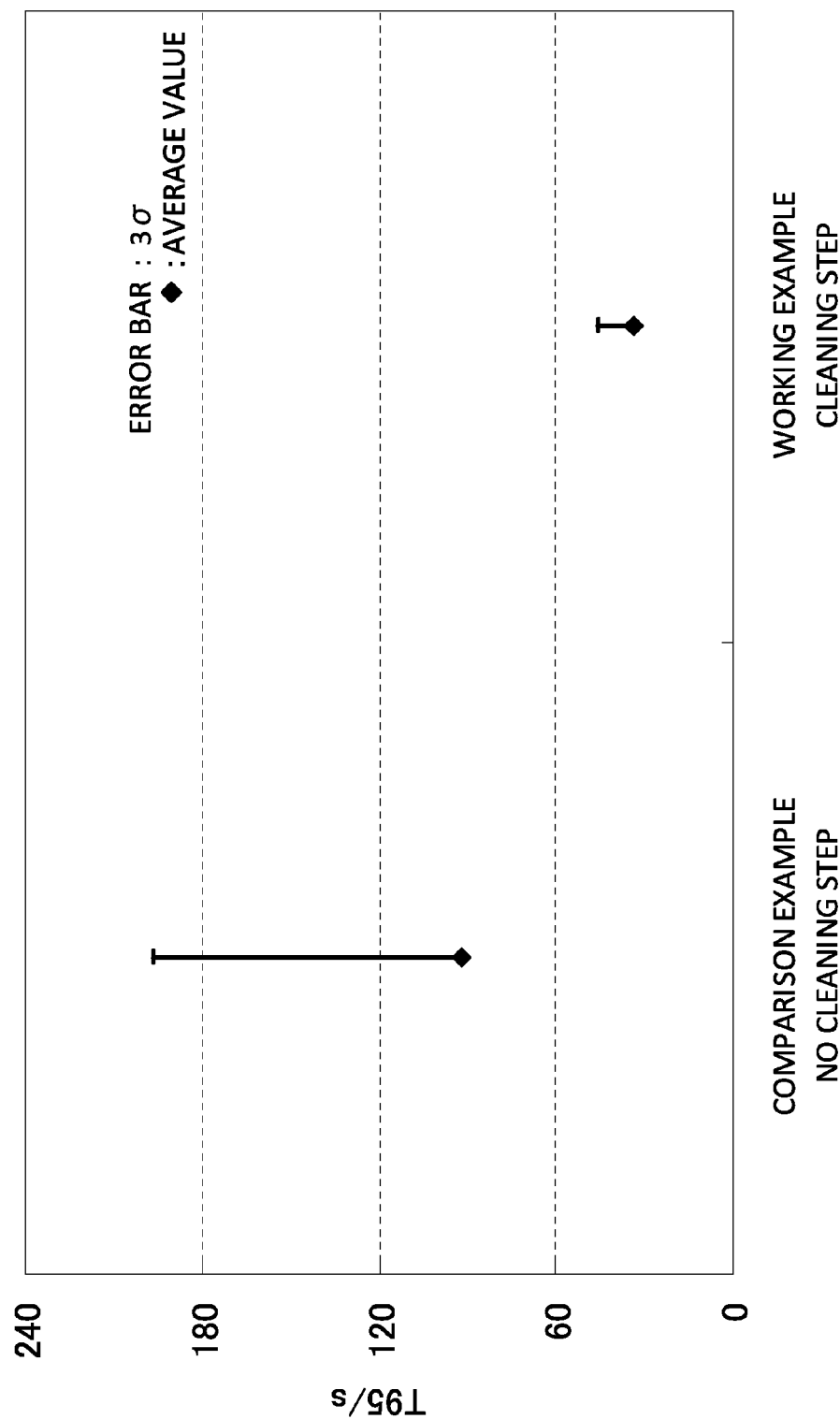
FIG. 3 is a graph showing a test result of pH electrodes in an example and a comparison example.

FIG. 3 shows a test result. As shown in FIG. 3, an average value of the 95% response time of the pH electrodes in the comparison example was 90 seconds, while an average value of the 95% response time of the pH electrodes in the example was 30 seconds.

The reason is supposed as follows: in the pH electrodes in the example, since an impurity of the hydrated layer was removed by cleaning before the measurement of the 95% response time, the responsivity was improved to quicken the response time, that is, to make the 95% response time faster than that in the comparison example.

As shown in FIG. 3, upon comparing the example with the comparison example, the example had a smaller variation in the 95% response time than the comparison example, and the comparison example had a larger variation in the 95% response time than the example.

Supposedly, the responsive glasses of all pH electrodes used in the test were cleaned to improve the responsivity in the example, reducing the variation in the response time, while some responsive glasses had an impurity to lower the responsivity in the comparison example, causing the variation in the response time.

REFERENCE SIGNS LIST

1: Glass electrode
2: Responsive glass

The invention claimed is:

1. A kit for glass electrode responsive-glass cleaning comprising:
   a glass-electrode responsive-glass cleaning agent that cleans a responsive glass used in a glass electrode; and
   a hydrated-layer forming agent that forms a hydrated layer on the surface of the responsive glass immersed in the hydrated-layer forming agent after cleaning by the glass-electrode responsive-glass cleaning agent, wherein
   the glass-electrode responsive-glass cleaning agent contains ammonium hydrogen fluoride having a predetermined concentration or a mixed solution of hydrofluoric acid and a salt of a strong base a fluoride ion;
   and the hydrated-layer forming agent is selected from the group consisting of a standard solution for pH calibration having a pH of 2, 4, or 7, hydrochloric acid, and nitric acid; and
   wherein the hydrated-layer forming agent does not include hydrofluoric acid.

2. The kit for glass-electrode responsive-glass cleaning according to claim 1, wherein
   the responsive-glass cleaning agent contains ammonium hydrogen fluoride, and
   the concentration of ammonium hydrogen fluoride is 4 mass % or less.

3. The kit for glass-electrode responsive-glass cleaning according to claim 1, wherein
   the responsive-glass cleaning agent cleans the responsive glass containing a metal oxide as a component.

4. A glass-electrode responsive-glass cleaning method using the kit for glass-electrode responsive-glass cleaning according to claim 1, wherein the method comprises:
   cleaning a responsive glass used in a glass electrode by using the responsive-glass cleaning agent, and
   forming a hydrated layer on the surface of the responsive glass by immersing the responsive glass in the hydrated-layer forming solution after cleaning.

5. The glass-electrode responsive-glass cleaning method according to claim 4, wherein
   during cleaning, the temperature of the responsive-glass cleaning liquid is kept to be 5 to 40° C.

6. The kit for glass-electrode responsive-glass cleaning according to claim 1, wherein
   the hydrated-layer forming agent is selected from the group consisting of hydrochloric acid and nitric acid.

7. A glass-electrode system comprising;
   a glass-electrode that has a responsive glass,
   a glass-electrode responsive-glass cleaning agent that cleans a responsive glass used in a glass electrode, and
   a hydrated-layer forming agent that forms a hydrated layer on the surface of the responsive glass immersed in the hydrated-layer forming agent after cleaning by the glass-electrode responsive-glass cleaning agent, wherein
   the glass-electrode responsive glass cleaning agent and the hydrated-layer forming agent are separated,
   the glass-electrode responsive-glass cleaning agent contains ammonium hydrogen fluoride having a predetermined concentration or a mixed solution of hydrofluoric acid and a salt of a strong base a fluoride ion, and
   the hydrated-layer forming agent is neutral or acidic.

* * * * *